United States Patent [19]

Schneider

[11] 4,022,633

[45] May 10, 1977

[54] METHOD OF STABILIZING SOILS

[76] Inventor: Gordon L. Schneider, P.O. Box 414, Clovis, Calif. 93612

[22] Filed: Dec. 12, 1975

[21] Appl. No.: 640,256

Related U.S. Application Data

[62] Division of Ser. No. 470,805, May 17, 1974, Pat. No. 3,950,179.

[52] U.S. Cl. .............................. 106/208; 61/36 R; 166/293; 166/294
[51] Int. Cl.² ...................... C08L 3/00; C08L 3/02
[58] Field of Search .......... 61/36 R, 36 B; 166/293, 166/294; 106/208, 287 SS,

[56] References Cited

UNITED STATES PATENTS

| | | | |
|---|---|---|---|
| 2,158,025 | 5/1939 | Holst et al. | 61/36 R |
| 3,818,998 | 6/1974 | Hessert | 166/294 |
| 3,950,179 | 4/1976 | Schneider | 106/208 |

Primary Examiner—Theodore Morris
Attorney, Agent, or Firm—Mason, Kolehmainen, Rathburn & Wyss

[57] ABSTRACT

A hydrous composition for stabilizing finely divided soils comprises a gum swellable when hydrated, such as sodium alginate; water; and an alcohol, such as methanol, in an amount sufficient to prevent the composition from setting prior to use. The composition is added to finely divided soils in an amount of about 5–25 gallons per foot mile per 6 inch lift. A hardener having a source of calcium, such as $CaCl_2$, is applied to the soil to harden the composition.

21 Claims, No Drawings

METHOD OF STABILIZING SOILS

This is a division of application Ser. No. 470,805, filed May 17, 1974 now U.S. Pat. No. 3,950,179.

The present invention relates to a composition useful in stabilizing finely divided or granular soil to prepare the soil for the construction of roadways, and more particularly to a composition of matter useful in hardening the surface of sand for stabilizing the sand for supporting heavy equipment or materials. The composition disclosed herein prevents finely divided soil such as sand from shifting position thereby enabling the soil to support overlying heavy materials.

Soils containing substantial quantities of sand or other granular materials are structurally unsound and unsuitable as a base material for supporting overlying heavy materials as are necessary in the construction of roadways and air fields. For many years a common approach to stabilizing such soil has been to incorporate "borrow" materials into the soil. Borrow materials such as gravel and other granular materials have been commonly used to provide support and drainage where economically available. Base soil has also been structurally improved by incorporating various chemicals therein such as portland cement, lime, calcium chloride, sodium silicate, various bituminous materials, resins, and the like. Normally, the chemicals are added in relatively large amounts, for example 10% or more, based on the dry weight of the soil. Cement has proven best in the stabilization of silt and very fine sands and for use with rock and gravel borrow materials.

Other chemicals have been employed as dry products for the purpose of controlling erosion in surface soils. A dry product known as "HydroMulch" for example, contains a combination of guar gum, a starch or glucose, and a small percentage of sodium or ammonium dichromate. Such a dry product is added to water just prior to use and is constantly agitated until added to the soil. The dichromate acts as a hardener and reacts with the guar gum to cause gelling. Recirculation or vigorous agitation is therefore necessary in such prior art compositions to prevent the setting of the composition prior to its addition to the soil.

Another disadvantage of the prior art compositions used in erosion control is the fact that an extensive period of time is necessary for the composition to set or gel properly after its application to the soil. The prior art compositions are therefore disadvantageous in that they must be kept dry until immediately prior to use, and then must be continuously agitated once mixed with water until applied to the soil. Once applied to the soil, inclement weather immediately after application may ruin the effects of the chemicals by dilution or otherwise by interrupting the surface application prior to curing or gelling thereof.

An object of the present invention is to provide a new and improved composition useful in stabilizing finely divided soils.

Another object of the present invention is to provide a new and improved composition which does not get or set prior to applying the composition to soil.

Another object of the present invention is to provide a new and improved composition useful in stabilizing soils wherein the composition does not require an extender for wettability.

Another object of the present invention is to provide a new and improved composition employing a hardener in hydrous solution wherein the composition does not set until applied to the soil.

Another object of the present invention is to provide a new and improved composition requiring very little or no agitation to prevent the composition from setting prior to use.

Another object of the present invention is to provide a new and improved composition wherein a separate hardener can be employed to immediately set the composition after its application to soil.

Another object of the present invention is to provide a new and improved composition employing a mixture of an alginate and a guar derivative for stabilizing finely divided soils.

Another object of the present invention is to provide a new and improved composition employing a hardener and also employing alcohol in an amount sufficient to prevent the composition from hardening prior to use.

Another object of the present invention is to provide a new and improved method of treating finely divided soils to stabilize the soil for supporting heavy equipment or materials.

Other objects and advantages of the present invention will become apparent from the following description of the invention.

Briefly, the composition of the present invention includes a swelling gum such as an alginate or guar derivative; water; and an alcohol in a percentage of at least 25% by volume based on the volume of alcohol plus water. The alcohol can be a monohydric alcohol having 1-4 carbon atoms. A hardener comprising a source of calcium is employed, preferably as a separate composition. Calcium chloride is preferred as a calcium source since it reacts with the gum to immediately set it and thereby positively bond adjacent soil granules or sand particles. It is preferred to first treat the soil with the gum composition and thereafter apply the hardener.

The hydratable gums used in the composition of the present invention have certain novel cementation properties. Upon setting or drying, the composition becomes relatively impervious to rehydration and therefore provides permanent and positive bonding between granular particles. The composition described herein has desirable properties making it useful in sands and other predominately granular soils for: (1) base or sub-base stabilization, (2) reduction of dust or washboarding in unsurfaced roads, and (3) control of wind and water erosion.

As a base or sub-base stabilizer, the composition of the present invention can be used where the cost of asphalt is prohibitive and especially where the primary purpose is that of moving heavy equipment over soils that will not ordinarily support such equipment.

The hydratable gum useful in the composition of the present invention is preferably an alginate or guar gum. The alginate can be an algin, or can be an alginate salt such as sodium, magnesium or potassium alginate. The guar derivatives, such as guar gum, are approximately as effective as the alginates. Guar derivatives are somewhat less expensive and are therefore preferred from a cost standpoint, however, the alginates are better for wet strength purposes. It is therefore desirable from an overall standpoint of both cost and wet strength to use a combination of guar derivatives and alginates. It has been found that within the ratio of about 1 part by weight of alginate to 2-3 parts of guar derivative there is a synergistic effect such that the wet strength and cost efficiency achieved is greater than that attributed by each component. Some of the useful gums are as follows: Seaweeds: Agar, Algin, Carrageenin, Fucoidan, Laminaran, Plant exudates: Gum arabic, Ghatti, Karaya, Tragacanth, Plant extracts: Pectin, Larch arabinogalactan, Ti, Plant seeds: Corn-hull gum, Guar, Locust bean, Quince seed, Psyllium seed, Flax seed, Tamarind, Wheat gum, Miscellaneous: Cellulose derivatives, Starch, Amylose, Amylopectin, Dextran, Chitin.

It has been found that the gum must be thoroughly wetted to make full use of its cementation properties. In prior art compositions, however, the necessary wetting of the gum prior to use, necessitated constant agitation of the fluid composition to prevent setting. Even constant agitation was not sufficient to prevent setting of the composition when a hardener was combined therewith. Although agitation beneficially causes wetting of the gum, it also causes intimate contact between hardener and gum thereby causing the gum to prematurely swell, rendering it useless in about 10 days.

Prior art compositions have included extenders, for example, flour, glucose or starch for the purpose of improving the wettability of guar gum when agitated in a water truck. The extenders were necessary in an amount of about 3 to 4 parts extender per part of guar gum, for the purpose of thorough hydration of the gum. It is an important feature of the present invention that when alcohol is employed in a minimum percent by volume of 25% based on the volume of alcohol plus water, it is unnecessary to employ an extender for the purpose of wetting the gum. A preferred alcohol content is 30–33% by volume. As much as 1¼ ounces of gum can be employed for each gallon of water without undue swelling when at least 25% alcohol is employed, so that the composition will remain useful over a long period of time.

Extenders undergo bacterial decomposition over long periods of time when mixed into the soil, especially in soils which retain moisture for long periods of time. When decomposition occurs, the soil becomes less stable with time. It is therefore important that extenders are not necessary in the composition described herein. The alcohol employed in the composition of the present invention is therefore important not only for the purpose of wettability of the gum, but also important in that extenders previously necessary can be omitted from the composition. A variety of alcohols have been employed such as methanol, denatured ethanol, propanol, isopropanol, butanol, and other lower alcohols.

An extender can be employed in the composition of the present invention, if desired, from a cost standpoint or for the purpose of achieving faster wetting of the plant protein. However, the extender is not necessary so long as the alcohol is employed in a percentage of at least about 25% by volume based on the total volume of alcohol and water. When used with an alginate, extenders should be employed in an amount of about 3–5 parts by weight extender per part of alginate. When used with an alginate salt, such as sodium or potassium alginate, the extender should be employed in an amount of about 1–2 parts by weight extender per part of alginate.

The extender may take the place of agitation in those compositions where agitation is otherwise necessary — for example, when calcium carbonate is employed directly into the composition of the present invention.

The alcohol is added in an amount not less than about 25 parts by volume for every hundred parts by volume of water and alcohol. It is preferred not to employ more than about 35 parts by volume of alcohol from a cost standpoint. The preferred composition employed is about 30 parts by volume alcohol per hundred parts of water and alcohol. At least 25% by volume alcohol is necessary to prevent the plant protein from swelling during mixing or in storage. Below 25%, the mixture will rapidly swell and set when in the water tank.

In the composition of the present invention the use of alcohol in a percentage of at least 25% by volume eliminates the necessity of an extender and eliminates the need for recirculation or other agitation in the container. A mixture containing less than 25% alcohol by volume swells excessively but with, for example, 30–35% alcohol by volume only a small amount of swelling occurs so that the gum is kept in partial suspension and is easily poured from the container. Only slight agitation is necessary just prior to pouring.

Another important feature of the present invention is the discovery that the soil must contain a source of calcium to harden the composition of the present invention after its application to the soil and to prevent the stabilization composition from softening or rehydrating when the treated soil is later wetted. The calcium source is necessary to improve the wet strength of the gum for permanent stability of the soil. It is more important that calcium be present in clay soils than in sand, since sand is inherently more stable when wet than clay. Wetted sand can support fairly heavy loads even without treatment with the composition described herein. Prior art compositions have employed dichromate as "hardeners." I have found that sodium dichromate and ammonium dichromate hardeners only enable the necessary ion exchange reaction between the gum and an existing calcium source. Thus, the dichromate only acts as a catalyst in the ion exchange reaction when calcium is already available in the soil being treated. The so-called dichromate "hardener" in such prior art compositions has very little effect where the soil does not have a sufficient amount of calcium. Further, the dichromate treated soil must go through a drying cycle to prevent rehydration.

I have found that when calcium chloride is employed as the hardener, the ion exchange reaction will occur immediately with the gum without the necessity of a dichromate catalyst. A preferred composition, therefore, is void of dichromate or other catalyst and is simply a combination of one or more hydratable gums, alcohol and water. Only calcium chloride will act in this manner to immediately set a swellable gum composition without the need for a dichromate catalyst. Other sources of calcium such as calcium carbonate and calcium hydroxide will not immediately react with the gum without employing a catalyst such as sodium dichromate or ammonium dichromate.

The calcium used to harden the stabilization composition of the present invention is a mixture of calcium chloride and water in an amount of about 10 gallons of saturated calcium chloride-water solution per thousand gallons of water. The $CaCl_2$ solution is added such that about 10–25% by weight $CaCl_2$ is present based upon the weight of gum in the composition.

The use of calcium chloride either before or after the application of the stabilization composition rapidly sets or hardens the stabilization composition to bridge the granular particles and provide positive bonding therebetween. It is preferred to add the $CaCl_2$ after application of the stabilization composition since pre-treatment therewith requires immediate compaction after the application of the composition to prevent dilution of the $CaCl_2$. The soil will immediately bond by immediate setting of the stabilization composition and the soil does not require immediate compaction when the $CaCl_2$ is applied after the application of the stabilization composition. The calcium chloride must be employed in a separate solution to be applied either before or after the application of the stabilization composition to the soil.

Post treatment with the hardener is preferred, especially in well drained sands, where the calcium chloride would be quickly lost by gravity through the granular particles if pre-treatment were employed. A surface application is of some value, but best results are obtained by applying the calcium chloride-water solution while the soil and stabilizing composition are being worked with graters or pulvimixers. Care must be exercised to make certain that the road is rolled and compacted before the final set occurs, or complete bonding of all the soil will not take place.

Another important feature of the present invention is the surprising discovery that as much as about 10% of the dichromate catalyst can be employed directly within the hydratable gum composition, so long as at least 25% alcohol is used, without the gum swelling to a point that the composition cannot be emptied from its container. Although dichromate "hardeners" have been employed with similar compositions, they have only been employed in dry compositions. This is because it is well known that the dichromate interacts in hydrous solution with gums to cause swelling and therefore setting of the composition.

It would appear that the alcohol would increase the rate at which the dichromate reacts with the gum and therefore quickly render the composition useless since alcohol increases the wetting of the gum. Quite surprisingly, however, the alcohol has an opposite effect preventing the reaction between the dichromate and the gum. The alcohol therefore enables the direct addition of as much as about 10% dichromate catalyst in a hydrous gum composition without the composition setting in the container. Where the soil being treated contains sufficient calcium to harden the gum composition, a dichromate catalyst employed directly in the hydrous composition is all that is necessary for the purpose of hardening the composition after application.

Sufficient calcium must be present in the soil or the gum will re-wet upon each subsequent period of rehydration with consequent softening and loss of strength. On rehydration, the organic bonds do not completely disintegrate unless mechanically destroyed by excessive loads, but enough softening occurs to render the surface of the soil undesirable for supporting heavy loads. The soil can easily be tested for its calcium content to determine if a separate $CaCl_2$ hardener must be applied or if a dichromate catalyst is sufficient. It has been found that 40 PPM calcium is insufficient for good waterproofing. To present the composition from re-hydrating after drying, it has been found that 100–150 PPM calcium must be present in the soil. In the range of 150–200 PPM calcium, waterproofing and resistance to re-hydration is excellent. A sample of the soil can be treated as described herein, using a dichromate catalyst and a representative heavy load applied thereto to see if the treated soil will support it. The treated soil can also be re-wetted to assure that re-hydration does not occur.

It is therefore preferred to package the dichromate catalyst separately until it is determined whether a dichromate catalyst or a $CaCl_2$ hardener is to be employed. The $CaCl_2$ hardener should be added in an amount of at least about 10% by weight based on the weight of gum in the composition. A preferred amount of $CaCl_2$ addition is in the range of 10–25% by weight based on the weight of gum, but greater amounts can be added if desired. When a dichromate catalyst is to be employed, it is preferred to add the water to the container first, then add the alcohol and then the hydratable gum to insure proper wetting of the gum before adding the dichromate solution.

Calcium carbonate can be employed in the hydrous stabilization as the calcium source together with a dichromate catalyst, so long as the mixture is sufficiently agitated to prevent setting of the composition. The calcium carbonate should be added in an amount of about 10–25% by weight based on the weight of swellable gum. The $CaCo_3$ can be added either directly to the hydrous composition or can be added directly to the soil. In either case, the $CaCo_3$ should be added in an amount of about 10–25% by weight based on the weight of gum present in the composition.

When $CaCl_2$ is not employed as the source of calcium, the composition will lose some of its effectiveness by being partially washed-out if it should rain before the composition is thoroughly dry. It is therefore important that $CaCl_2$ be used whenever inclement weather threatens.

In another embodiment of the present invention, a sludge acid is employed in addition to the stabilization composition and both additives are used in soil stabilization and in erosion control where clay does not predominate. Typical sludge acids are disclosed in my copending application Ser. No. 319,455, filed Dec. 29, 1972. Application Ser. No. 319,455 is herein incorporated by reference. The sludge acids as set forth in my copending application usually result as a by-product from the refining of petroleum oils or benzene. The formation of some of the sludge acids is described in U.S. Pat. No. 2,705,681. However, in the U.S. Pat. No. 2,705,681 as described, the sludge acids are neutralized subsequent to formation. When used in accordance with the present invention, the sludge acid is not neutralized.

As set forth in my copending application Ser. No. 319,455, a sludge acid is very complex and virtually impossible to define chemically, but it is well known in the art. All types of acid sludges disclosed in Ser. No. 319,455 can be used in addition to the composition of the present invention in the stabilization of granular soil bases. Further, as set forth in my copending application, in certain types of soils the addition of petroleum oil or asphalt may also be advantageous.

When the stabilization composition described herein is mixed with a sludge acid, the sludge acid should be present in an amount of approximately 0.4 gallons per foot mile per 6 inch depth of soil. The sludge acid can be conveniently introduced to the soil by combining it with mixing water and agitating for a period of about 5 minutes before adding the hydrous mixture to the soil. The stabilization composition of the present invention is then added with the remaining portion of the water and the mixture agitated for about 5 additional minutes. The stabilization composition is added at a rate of about 5-25 gallons per foot mile per six inch lift. The sludge acid and stabilization composition are added to the soil separately.

When asphalt or petroleum oil is also added, the addition is in an amount ranging from about 2-5% based on the total weight of the composition. The viscosity of the asphalt can be decreased for better mixing by the addition of a suitable solvent such as gasoline.

More specifically, in employing a sludge acid, the base material, for example, sand, is first scarified about 4-6 inches. The sludge acid is then worked into a windrow by using a blade until the material is evenly distributed. The sludge acid is applied at a rate of about 2 gallons per 1000 gallons of water per foot mile per 6 inch depth of soil. The resulting material is then spread the full width of the road, by using a blade, to an effective depth of about 6 inches. The material is then compacted with a pneumatic roller followed by compaction with a Wagner roller. Approximately one hour after compacting, water is re-applied to the treated section in order to obtain a sealed and polished finish. The stabilization composition is then applied. If desired, borrow material, for example, blow sand, can be first placed in a windrow and the composition of the present invention run through the windrow at a rate of about 15 gallons per foot mile per thousand gallons of water. The material is then bladed for the full width of the road to an approximate depth of 4 inches. The road is then compacted with a pneumatic roller followed by compaction with a Wagner roller. The blading and compaction procedures can then be repeated with a second 3 inch to 4 inch lift of stabilized base course, if desired. The soil is now ready for further construction and surfacing, for example, surfacing with ½ to ⅝ inch asphalt chips applied in place. The sludge acid must be added prior to the addition of the stabilization composition since the mixing of the two materials will neutralize their effectiveness.

The minimum rate of application of the stabilization composition should be about 5 gallons per thousand gallons of water. Preferably, it should be about 10 gallons per thousand gallons of water. The solution is then added at that concentration at a rate of about 250 gallons per foot mile.

For dust control only, the composition of the present invention may be applied to the surface of the soil and repeated whenever necessary. Otherwise, as in soil stabilization and control of washboarding the composition should be worked into the road to a depth of 3-5 inches at a rate of about 3-4 gallons of hydrous mixture per foot mile. If the area is to be seeded, seeding should be done before the application of either the sludge acid (when used) or the stabilization composition.

The following table indicates the results to be expected when the stabilization composition of the present invention is used in the strength indicated and applied at the rate of 2000 gallons per acre or 250 gallons per foot mile:

| Strength of solution | Results |
| --- | --- |
| 5 gallons per 1000 gal. $H_2O$ | Light bonding; High water penetration. |
| 10 gallons per 1000 gal. $H_2O$ | Moderate bonding; Good water penetration. |
| 15 gallons per 1000 gal. $H_2O$ | Good bonding; Moderate water penetration. |
| 20 gallons per 1000 gal. $H_2O$ | High bonding; Low water penetration. |
| 25 gallons per 1000 gal. $H_2O$ | Full cementation; No water penetration. |

A sandy soil is first treated with sludge acid applied at a rate of 0.35 gallons per foot mile per 6 inch lift, followed by the application of the stabilization composition at a rate of about 8.80 gallons per foot mile per six inch lift. About 5000 gallons of water are used with sludge acid and 9000 gallons of water used with the stabilization composition.

After treatment with the sludge acid and the stabilization composition, the treated soil is then surfaced with an inverted double chip seal coat. An examination of the surface road was made approximately three months after the soil was treated and surfaced. The section so treated and surfaced with asphalt appeared to be in excellent condition showing no signs of distress. This was after receiving traffic load of approximately 200 cars per day.

After the application of the composition of the present invention, in making tests for compressive strength, the soil is first compacted and thereafter cured prior to testing. Specimens were prepared in various curing environments to determine the relationship between unsealed samples and sample cured in sealed containers and to check the effect of temperatures on curing. The following are the compressive strength results of a group of specimens made in selected environments performed on Indiana Dunes sand mixed with 20 gallons of the composition of the present invention and one gallon of sludge acid and thereafter cured for seven days:

| Combination | Curing Environment | Unconfined Compressive Strength |
| --- | --- | --- |
| 1 | Unsealed - 70° | 90 PSI |
| 2 | Unsealed - 100° | 70 PSI |
| 3 | Unsealed - 130° | 45 PSI |
| 4 | Sealed container - 70° | 5 PSI |
| 5 | Sealed container - 100° | 10 PSI |
| 6 | Sealed container - 130° | 20 PSI |

As seen from the above table, the best results are obtained by curing at room temperature in an unsealed medium (see 1 above).

Further tests were made to determine the compressive strength of soils treated with the composition of the present invention alone, when mixed with sludge acid, and when mixed with sludge acid and asphalt cut back with gasoline. When sludge acid is mixed with the composition, it should be added in an amount of about 2-8% by weight of total composition. It is preferred to add a solvent, such as gasoline, to asphalt such that the asphalt content is about 1-3%, preferably 1-5% when asphalt is mixed with the stabilization composition. The cut back asphalt solution is then added in an amount of about 2-8% by weight of the total composition. The following results were obtained:

| Mix | Chemical Rate | Unconfined Compressive Strength |
| --- | --- | --- |
| 1 | 20 gals. stabilization composition, 1 gal. sludge acid | 295 PSI |
| 2 | 1.5 gals. sludge acid | 335 PSI |
| 3 | 20 gals. stabilization compo- | |

-continued

| Mix | Chemical Rate | Unconfined Compressive Strength |
|---|---|---|
|  | sition | 405 PSI |
| 4 | 20 gals stabilization composition, 1 gal. sludge acid, 0.9 gals. asphalt in solvent | 225 PSI |

Note: All chemical rate is given in gallons per foot mile per 6 inch lift mixed per 1000 gallons of water. The rate of asphalt in solvent (asphalt content of 1.5%) is in gallons per square yard.

As seen from the above table, the highest compressive strengths were obtained by using the composition of the present invention alone (see 3 above). However, when the composition alone (3) is compared with the composition mixed with sludge acid (1), the composition of the present invention has a greater tendency to ravel. Mix number 4, containing the asphalt cut back with gasoline and the sludge acid has the best waterproof qualities even though it had the lowest compressive strength.

Another factor that affects the study is the fact that the sludge acid reaches its highest compressive strength values in the laboratory when cured at elevated temperatures, whereas the composition of the present invention reacts best when cured at room temperature.

A number of mixes were prepared using varying amounts of the stabilization composition, sludge acid, and asphalt cut back with gasoline. The asphalt was used to increase the waterproofing characteristics of the stabilized sand. The following mixes were prepared:

|  | Asphalt | Sludge Acid | Stabilization Composition | Compressive Strength | Absorption |
|---|---|---|---|---|---|
| 1 | 2% | 1 gal./ft. mi. | 10 gal./ft. mi. | 52 PSI | 1.6% |
| 2 | 2% | 1 gal./ft. mi. | 15 gal./ft. mi. | 30 PSI | 2.2% |
| 3 | 3% | 1 gal./ft. mi. | 10 gal./ft. mi. | 22 PSI | 2.0% |
| 4 | 3% | 1 gal./ft. mi. | 15 gal./ft. mi. | 50 PSI | 1.5% |
|  |  | Composition of S.N. 319,455 |  |  |  |
| 5 | 3% | 1 gal./ft. mi. | 20 gal./ft. mi. | 44 PSI | 2.4% |
| *6 | 3% | 10 gal./ft. mi. | 20 gal./ft. mi. | 10 PSI | — |
| 7 | 3% | 20 gal./ft. mi. | 20 gal./ft. mi. | 10 PSI | — |
| 8 | 3.5% | 1 gal./ft. mi. | 20 gal./ft. mi. | 52 PSI | 1.5% |

* Mix No. 6 also contained 10% fly ash by dry weight.

As seen from these tests, compressive strengths of from 10–52 PSI were obtained. In mixes with 20 PSI or more compressive strength, absorption tests were performed on additional specimens. On the basis of these tests, it was found that the preferred composition is that of mix number 4 containing approximately 3% asphalt about one gallon of sludge acid, combined with about 15 gallons of the stabilization composition per foot mile.

The composition of my copending application Ser. No. 319,455 can also be added to the stabilization composition disclosed herein for further stabilization. When the composition of Ser. No. 319,455 is also added, it is generally added in an amount of about 5–25 gallons per foot mile per 1000 gallons of water per 6 inch lift.

The sludge acid and stabilization composition were then tested individually and together on various soils to determine compressive strength at various rates of application:

| Mix | Material Description | Sample No. | Chemical Rate | Unconfined Compressive Strength |
|---|---|---|---|---|
| 1 | Recycled Emulsion and Base Course | A | 1 gal. sludge acid | 180 PSI |
| 2 | Base Course | B | 1 gal. sludge acid | 95 PSI |
| 3 | Fine Sand | C | 10 gal. stabilization comp. .4 gal. sludge acid | 90 PSI |
| 4 | Fine Sand and Lignins | D | 10 gal. stabilization comp. .4 gal. sludge acid | 155 PSI |

Specimens were prepared using New Mexico Route 117 blow sand with the stabilization composition employing guar gum in comparison to the composition employing ½ sodium alginate and ½ guar gum:

RESULTS:

| Mix No. | Chemical Rate | Unconfined Compressive Strength |
|---|---|---|
| 1 | 20 gals. guar gum composition; 1 gal. sludge acid | 295 PSI |
| 2 | 20 gals. ½ guar gum, ½ sodium alginate composition; 1 gal. sludge acid | 335 PSI |

What is claimed and desired to be secured by Letters Patent of the United States is:

1. A method of stabilizing soil comprising adding a stabilizing composition to a soil at a concentration of about 5–25 gallons of the composition per 1000 gallons of water per 6 inch lift, the composition comprising a hydratable gum in an amount effective in providing positive bonding between granular particles, water, and a monohydric alcohol having 1–4 carbon atoms in an amount of at least 25% by volume based upon the volume of alcohol and water in the composition.

2. A method as defined by claim 1 wherein the composition is added to the soil by blading the composition into the soil to a depth of 4–6 inches.

3. A method as defined by claim 1 wherein the composition is added to the soil by mixing the composition with borrow material and mixing the borrow material into the soil.

4. A method as defined by claim 2 wherein the borrow material is sand.

5. A method as defined by claim 1 wherein the soil is treated by adding sludge acid to the soil at a rate of about 2 gallons of sludge acid per foot mile per 6 inch depth of soil.

6. A method as defined by claim 4 further including adding $CaCl_2$ to the soil after treatment with the composition to set the composition.

7. A method as defined by claim 1 wherein the gum is a mixture of an alginate and a guar derivative.

8. A method as defined by claim 1 wherein the alcohol is selected from the group consisting of methanol, ethanol, propanol, isopropanol and butanol.

9. A method as defined by claim 1 wherein the composition further includes up to 10% by weight of a catalyst selected from the group consisting of sodium dichromate and ammonium dichromate.

10. A method as defined by claim 1 wherein the composition further includes an extender selected from the group consisting of flour, glucose and starch.

11. A method as defined by claim 6 wherein the guar derivative is guar gum.

12. A method as defined by claim 6 wherein the alginate is sodium alginate.

13. A method as defined by claim 1 wherein the alcohol is present in an amount of about 30–33% by volume.

14. A method as defined by claim 1 wherein up to 1¼ ounces of the gum is present for each gallon of water in the composition.

15. A method as defined by claim 9 wherein 1–2 parts of extender are present for each part of gum.

16. A method as defined by claim 1 wherein the composition further includes a sludge acid in an amount of about 2–8% by weight of total composition.

17. A method as defined by claim 15 wherein the composition further includes asphalt.

18. A method as defined by claim 1 further including surfacing the treated, stabilized soil with asphalt.

19. A method as defined by claim 4 wherein the sludge acid is added to the soil prior to the addition of the stabilization composition to the soil.

20. A method as defined by claim 1 wherein the stabilized soil is compacted after application of the stabilization composition.

21. A method as defined by claim 1 wherein the composition further includes a soil stabilizing agent comprising the reaction product of a calcium compound selected from the group consisting of calcium carbonate, calcium fluorapatite, calcium phosphate, calcium sulfate, calcium oxide, and Portland cement and a sulfuric acid sludge having not less than 60% acid nor more than 35% entrained hydrocarbons.

* * * * *